United States Patent
Muik

(10) Patent No.: US 9,777,710 B2
(45) Date of Patent: Oct. 3, 2017

(54) METHOD FOR STOPPING AND LOCKING A WIND TURBINE ROTOR BY SHORT-CIRCUITING GENERATOR STATOR WINDINGS

(71) Applicant: WIND-DIRECT GMBH, Mannheim (DE)

(72) Inventor: Tobias Muik, Bensheim (DE)

(73) Assignee: Wind-Direct GmbH, Mannheim (DE)

( * ) Notice: Subject to any disclaimer, the term of this patent is extended or adjusted under 35 U.S.C. 154(b) by 107 days.

(21) Appl. No.: 14/777,815

(22) PCT Filed: Mar. 11, 2014

(86) PCT No.: PCT/EP2014/000643
§ 371 (c)(1),
(2) Date: Sep. 17, 2015

(87) PCT Pub. No.: WO2014/146764
PCT Pub. Date: Sep. 25, 2014

(65) Prior Publication Data
US 2016/0290318 A1  Oct. 6, 2016

(30) Foreign Application Priority Data
Mar. 18, 2013  (DE) .......... 10 2013 004 580

(51) Int. Cl.
*F03D 9/00* (2016.01)
*F03D 7/02* (2006.01)
(Continued)

(52) U.S. Cl.
CPC .......... *F03D 7/0264* (2013.01); *F03D 7/0244* (2013.01); *F03D 7/0272* (2013.01);
(Continued)

(58) Field of Classification Search
CPC .... F03D 7/0244; F03D 7/0264; F03D 7/0272; F03D 80/00; F03D 80/50; F03D 9/25;
(Continued)

(56) References Cited

U.S. PATENT DOCUMENTS 2,360,792 A * 10/1944 Putnam ................ F03D 7/0224
290/4 R
7,397,145 B2   7/2008 Struve et al.
(Continued)

FOREIGN PATENT DOCUMENTS

DE  102007058746 A1  12/2008
EP       2333325 A1   6/2011
WO    2005090780 A1   9/2005

Primary Examiner — Tulsidas C Patel
Assistant Examiner — S. Mikailoff
(74) Attorney, Agent, or Firm — Laurence A. Greenberg; Werner H. Stemer; Ralph E. Locher

(57) ABSTRACT

A method for locking the rotor of a wind turbine includes providing the rotor with at least one rotor blade which can be displaced about its longitudinal axis by an adjusting device from an operating position into a vane position, in which substantially no torque acts upon the rotor. The rotor drives a generator and can be prevented from rotation in a locking position by inserting a locking bolt into a rotor-side receiving opening. A wind turbine for performing the method includes a rotor which is induced into a creeping rotational movement at such a low rotational speed by short-circuiting at least one stator winding of the generator that a locking bolt can be inserted into a rotor-side receiving opening while the rotor is rotating.

6 Claims, 2 Drawing Sheets

(51) Int. Cl.
  *F03D 80/00* (2016.01)
  *H02P 3/22* (2006.01)
  *F03D 9/25* (2016.01)
  *F03D 80/50* (2016.01)
(52) U.S. Cl.
  CPC ............... *F03D 9/25* (2016.05); *F03D 80/00* (2016.05); *F03D 80/50* (2016.05); *H02P 3/22* (2013.01); *F05B 2260/30* (2013.01); *F05B 2260/903* (2013.01); *Y02E 10/723* (2013.01); *Y02E 10/725* (2013.01)
(58) Field of Classification Search
  CPC .. F05B 2260/30; F05B 2260/903; H02P 3/22; Y02E 10/723; Y02E 10/725
  See application file for complete search history.

(56) References Cited

U.S. PATENT DOCUMENTS

| | | | | |
|---|---|---|---|---|
| 8,210,810 B2* | 7/2012 | Egoshi | ...................... | F03D 1/06 416/1 |
| 8,334,608 B2 | 12/2012 | Pechlivanolglou et al. | | |
| 8,556,591 B2* | 10/2013 | Koronkiewicz | ........ | F03D 80/50 415/122.1 |
| 8,624,413 B2* | 1/2014 | Tsutsumi | .............. | F03D 7/0244 290/44 |
| 8,803,349 B2* | 8/2014 | Rebsdorf | .............. | F03D 7/0228 290/44 |
| 9,470,208 B2* | 10/2016 | Nies | ..................... | F03D 7/0248 |
| 2004/0100102 A1* | 5/2004 | Wobben | .................. | F03D 7/0272 290/55 |
| 2010/0013343 A1* | 1/2010 | Bi | ............................ | H02K 7/09 310/198 |
| 2010/0123314 A1* | 5/2010 | Menke | .................. | F03D 7/0248 290/44 |
| 2011/0121579 A1 | 5/2011 | Eriksen et al. | | |
| 2011/0260461 A1* | 10/2011 | Egoshi | ...................... | F03D 1/06 290/55 |
| 2011/0280725 A1* | 11/2011 | Taylor | .................. | F03D 7/0224 416/1 |
| 2012/0282093 A1* | 11/2012 | Rebsdorf | .............. | F03D 7/0228 416/1 |
| 2013/0193686 A1* | 8/2013 | Perley | .................. | F03D 7/0224 290/44 |
| 2014/0010651 A1* | 1/2014 | Nies | ..................... | F03D 80/00 416/1 |
| 2014/0010656 A1* | 1/2014 | Nies | ..................... | F03D 7/0244 416/204 R |

\* cited by examiner

METHOD FOR STOPPING AND LOCKING A WIND TURBINE ROTOR BY SHORT-CIRCUITING GENERATOR STATOR WINDINGS

BACKGROUND OF THE INVENTION

Field of the Invention

The invention relates to a method for locking the rotor of a wind turbine and, in which the rotor has at least one rotor blade which can be adjusted about its longitudinal axis by an adjusting device from an operating position to a vane position in which substantially no torque is exerted on the rotor, and in which the rotor drives a generator and can be blocked against rotation in a locking position by inserting a locking bolt into a rotor-side receiving opening. The invention also relates to a wind turbine for carrying out the method, including a rotor which drives a generator and has at least one rotor blade which can be adjusted by an adjusting device from an operating position to a vane position, wherein the rotor can be blocked against rotation in a locking position by inserting a locking bolt into a rotor-side receiving opening.

Modern wind turbines in the multi-megawatt range are generally equipped with rotor blades which can be rotated about their central longitudinal axis by an adjusting device in order to rotate said rotor blades out of the wind as required, this also being called the "rotor pitch" by experts. If the rotor blades are "pitched" out of the wind, the surface area of the rotor on which the wind acts is reduced and the aerodynamic torque on the drive shaft is minimized. Since this described aerodynamic brake is usually the only brake, each of the rotor blades has to be equipped with a fully redundant pitch system, so that the remaining blades can also be reliably rotated out of the wind in the event of a malfunction of a blade or of the associated adjusting device, and as a result certain reduction of the rotation speed can be ensured. After the braking process, the rotor normally remains in the so-called "idling mode" in which the rotor blades can move freely in the wind similarly to a flag. As a result, the turbine is not completely stopped, but rather the aerodynamic loads on the rotor and tower are considerably reduced.

It is only necessary to stop the rotor for servicing and repair work on the rotating part of the turbine, for example on the hub-side part of the adjusting device or on the rotor etc. In order to stop the wind turbine for work of this kind, said wind turbine is, as is known, braked by a mechanical braking device in the drive train and the rotor is locked in an interlocking manner in the desired angular position in which the rotating hub-side part of the rotor is accessible in particular. Said locking is prescribed in the relevant standards and involves a locking bolt being manually inserted from the stator into a corresponding receiving bore in the rotor in the braked state. In order to be able to insert the bolt from any desired rotor position for locking purposes, it is known in practice to move the rotor to the desired position, for example by the generator which is driven as motor in this case. In this connection, one disadvantage is that a 4-quadrant converter and a position sensor for the rotor position are additionally required for this purpose, this additionally making the wind turbine more expensive. If the converter is not ready for operation (for example owing to the absence of a power supply system), it is additionally possible, given a sufficient amount of wind, to move to the desired rotor position by targeted manual adjustment of the rotor blades and simultaneous operation of the mechanical brake, and to set said desired rotor position firmly by the brake, in order to then manually insert the locking bolt into the rotor-side receiving opening. However, in practice, this requires a comparatively large amount of experience and trained personnel since the mechanical brake and adjustment of the rotor blade have to be changed at the same time depending on the respective wind speed and wind direction.

Electromechanical and hydraulic rotor brakes are used at present. The hydraulic braking apparatuses which are common on the market have the disadvantage that oil leaks and worn valves in the hydraulic system often lead to a loss in braking force and even to total failure of the braking system. Frequent servicing work on the hydraulic system additionally results in high servicing costs and long downtimes of the wind turbine. The servicing costs and downtimes owing to a faulty hydraulic system are very much higher particularly in offshore installations than in onshore installations.

The known electromechanical rotor brakes offer a greater degree of reliability and improved functionality in comparison to hydraulic rotor brakes. The brake pads are moved by an electric motor in said known electromechanical rotor brakes. The main advantages of the electromechanical rotor brakes in comparison to the hydraulic systems lie in the more compact construction of the brake systems owing to the omission of the hydraulic assembly and the reduced number of components. Even though the electromechanical rotor brake systems exhibit an increased installation reliability and lower outlay on servicing, the worn brake pads also have to be replaced in this case.

In the case of wind turbines with a gear mechanism between the turbine and the generator, the mechanical rotor brake is usually installed on the high speed shaft on account of the relatively low torque and the associated reduced installation volume. However, in the case of a directly driven wind turbine, the turbine-side torque which is relatively high in comparison has to be absorbed by the brake. The braking device therefore has a large installation volume and as a result leads to a considerable amount of extra complexity in the nacelle.

Nevertheless, in spite of the abovementioned disadvantages, the mechanical rotor brakes cannot be dispensed with in the case of the known wind turbines since it would otherwise not be possible to brake and lock the rotor at all if a converter is not ready for operation.

BRIEF SUMMARY OF THE INVENTION

Accordingly, one object of the present invention is to provide a method for locking the rotor of a wind turbine and also a wind turbine for carrying out the method, in which method and wind turbine the use of an additional mechanical braking device can be dispensed with.

According to the invention, this object is achieved by the features recited below.

Further features of the invention are described in the dependent claims.

According to the invention, the method for locking the rotor of a wind turbine, which rotor drives a generator and has at least one rotor blade which can be adjusted about its longitudinal axis by an adjusting device from an operating position to a vane position in which substantially no torque is exerted on the rotor, wherein the rotor can be blocked against rotation in a locking position by inserting a locking bolt into a rotor-side receiving opening, is distinguished in that the rotor is set, by short-circuiting at least one stator winding of the generator, into a creeping motion at a rotational speed which is so low that the locking bolt can be inserted into the rotor-side receiving opening while the rotor is creeping.

In this case, the method according to the invention requires a generator, in particular a synchronous generator with permanent-magnet excitation, wherein the invention makes use of the physical effect that the rotor field of the generator which is permanently present independently of the power supply system induces an electrical voltage in the associated stator winding each time the rotor moves. If the generator is an electrically excited synchronous generator, the excitation is performed with the aid of batteries if the power supply system is absent. Owing to a suitable short-circuiting circuit of the stator winding and operation, or opening, of a short-circuiting switch with which preferably all three phases of the generator are short-circuited in relation to one another in accordance with the machine equivalent circuit diagram in FIG. 2, the resulting electromagnetically braking force of the generator is then used in order to move the rotor, which is driven by the wind on account of the almost assumed vane position of the rotor blades at a comparatively low torque, to the locking position in which the locking bolt can be inserted into the associated opening.

Even though the rotor rotation speed cannot be fully reduced to zero by the electromagnetically generated countertorque, but rather the rotor always has to rotate at an albeit very low rotational speed in order to generate the braking effect, it was recognized by the applicant that the creeping movement which is established is slow enough in order to be able to reliably mechanically couple the rotor of the turbine to the stator by inserting the bolt when the locking position is reached and as a result to reliably lock the rotor of the wind turbine when working on the rotor. Therefore, a mechanical braking apparatus which is complicated and requires a great deal of servicing is advantageously no longer required.

In the preferred embodiment of the invention, the method comprises the method steps described below for this purpose.

First, the wind turbine is moved to the idlingmode by adjusting the at least one rotor blade, but preferably all of the rotor blades, from the operating position to the vane position. When the idling mode has been securely established, the wind speed and/or the wind direction are detected or checked and the nacelle of the wind turbine is then tracked in such a way that the rotor axis points substantially in the wind direction. The rotor rotation speed is then checked and the idling mode is verified by the rotor rotation speed being substantially zero. The at least one stator winding of the generator, which is a directly driven synchronous generator with permanent-magnet excitation in particular, is then short-circuited in order to initiate the creeping rotation movement of the rotor. The at least one rotor blade is then adjusted in relation to the vane position depending on the wind strength in order to move to the desired locking position. As soon as said locking position is reached, the locking bolt is inserted into the receiving opening. The at least one rotor blade is then preferably adjusted back to the vane position again.

In the preferred embodiment of the method according to the invention, the at least one rotor blade is adjusted in an angular range of between approximately 95° and 85° degree in relation to the rotation plane of the rotor in order to move to the locking position from the vane position (90°). In this case, the respective angle is particularly manually set and changed depending on the current wind speed and/or wind direction. In the preferred embodiment of the method, the angle is continuously adjusted in said range as the rotor blade moves to the locking position, in order to keep the desired rotational speed of the creeping rotation movement preferably substantially constant and below a maximum upper limit.

In this case, the rotational speed of the rotor during the creeping rotational movement is set by "pitching" the rotor blade or the rotor blades such that said rotation speed is less than 1 degree/s, and particularly between 0.00 and 0.15 degree/s.

According to a further concept on which the invention is based, it may be expedient to once again further reduce the rotation speed of the creeping rotation movement shortly before the locking position is reached by adjusting the rotor blade angle in the direction of the vane position, in order to further reduce the forces which are exerted onto the bolt by the rotating rotor after said bolt is inserted into the rotor-side receiving opening.

Even though wind tracking of the nacelle is preferably manually performed depending on the currently prevailing wind speed and/or wind direction, it may be advantageous, particularly in the case of large wind turbines, to carry out checking of the wind speed and/or wind direction and/or tracking of the nacelle and/or checking of the rotor rotation speed and verifying of the idling mode and preferably also short-circuiting of the at least one stator winding and moving to the desired locking position in an automated manner. Similarly, inserting the locking bolt into the receiving opening when the locking position is reached can be performed not only manually but also by a motorized drive, or by a spring-elastic force which acts on the bolt, for example a pretensioned compression spring which pushes the bolt in the direction of the receiving opening.

According to a further concept on which the invention is based, a wind turbine for carrying out the above-described method comprises a rotor which drives a generator and has at least one rotor blade which can be adjusted by an adjusting device from an operating position to a vane position, wherein the rotor can be blocked against rotation in a locking position by inserting a locking bolt into a rotor-side receiving opening. The wind turbine is distinguished in that it has a short-circuiting switch, in particular in the form of a manually operable switch in the nacelle, it being possible for said short-circuiting switch to short-circuit the at least one stator winding, but preferably all of the stator windings of the generator in relation to one another, in order to set the rotor into a creeping rotational movement at a rotation speed which is so low that the locking bolt can be inserted into the rotor-side receiving opening while the rotor is rotating.

The generator is preferably a directly driven synchronous generator with permanent-magnet excitation. Even though the permanent magnets are preferably seated radially outside the stator coils in order to increase the braking torque of the short-circuited generator during the creeping rotational movement, it is likewise feasible to arrange said permanent magnets radially inside the stator coils.

The generator advantageously has a large number of stator coils, the windings of said coils in this case preferably all being electrically conductively connected to one another jointly by means of the short-circuiting switch in order to permit the creeping rotation movement of the rotor. In this embodiment of the invention, the short-circuiting switch is in the form of, for example, a step switch and comprises a plurality of individual switches which are associated with the stator windings and which can be operated separately. By means of said individual switches, the stator windings can each be short-circuited individually in order to generate braking torques of different intensities, wherein, in the case of a multi-step switch, for example, one stator winding is short-circuited in the 1$^{st}$ stage, two stator windings are jointly short-circuited in the second stage, and all three stator windings are jointly short-circuited in the third stage.

BRIEF DESCRIPTION OF THE SEVERAL VIEWS OF THE DRAWING

The invention will be described below using the example of a wind turbine according to the invention for carrying out the above-described method according to the invention with reference to drawings, in which.

DESCRIPTION OF THE INVENTION

Figure 1:
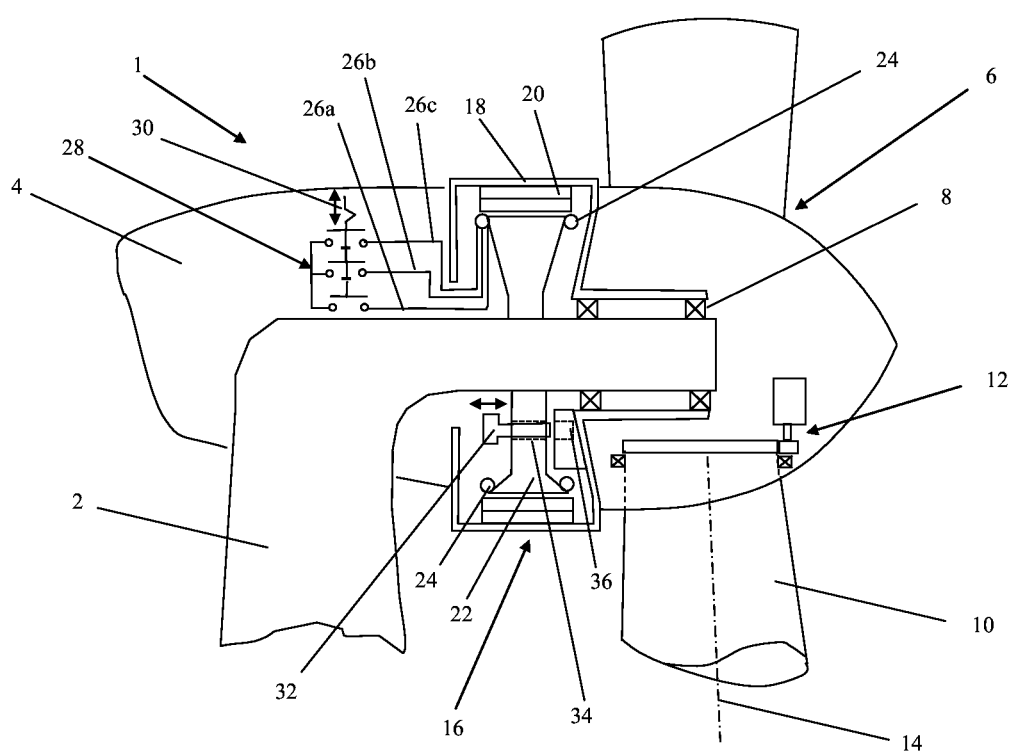
FIG. 1 is a schematic illustration of a wind turbine according to the invention.

As shown in FIG. 1, a wind turbine 1 according to the invention comprises a tower 2, only a detail of which is illustrated, having a nacelle 4 which can be pivoted about the tower longitudinal axis and on which a rotor 6 is held in a rotatable manner by means of schematically indicated bearings 8. The rotor 6 comprises two, three or more rotor blades 10, of which at least one rotor blade 10, but preferably all of the rotor blades, can be rotated about its rotor blade axis 14 by means of a schematically indicated adjusting device 12 in order to rotate said rotor blade out of the illustrated operating position to a position which is called the vane position in which the angle between an imaginary central center plane of the rotor blade 10 and the rotation plane which is spanned by the rotating rotor 6 is 90°.

As can further be gathered from the illustration in FIG. 1, the rotor 6 is drive-coupled to a generator 16 which, in the illustrated embodiment of the wind turbine 1 according to the invention, is designed as a directly driven external rotor synchronous generator of which the radially outer generator rotor 18 is fitted around its inner face with permanent magnets 20 which extend around the stator 22, which is held on the nacelle 4 or on the tower 2 in a manner fixed to a frame, by way of their inner face with a small spacing. A large number of stator windings 24 are arranged opposite the permanent magnets on the stator 22 of the generator 16, said stator windings being interconnected to one another in such a way that an alternating voltage is induced in the stator windings 24 when the rotor 6 rotates, said alternating voltage being tapped off at the three schematically indicated phases 26a, 26b and 26c of the stator windings 24 and being fed to an electrical supply system in a known manner by means of an inverter, not shown, or the like.

As is further shown in the illustration in FIG. 1, a short-circuiting switch 28 is preferably arranged within the nacelle 4, it being possible for said short-circuiting switch to be preferably manually operated by an operator, who is located in the nacelle 4, in accordance with the double-headed arrow 30 in order to electrically short-circuit the three phases 26a, 26b and 26c in relation to one another or to interrupt the short-circuited line connection.

As a result, it is possible, in conjunction with adjusting the rotor blades 10 from the vane position in a range of between preferably approximately 95° and 85° degree in relation to the rotation plane of the rotor 6, to set the rotor 6 into a creeping rotational movement at a rotational speed which is so low that a locking bolt 32, only schematically indicated, which is held in a movable manner in a guide bore 34 which is connected to the stator 22 of the generator 16, or to the nacelle 4, in a manner fixed to a frame, can be inserted into a rotor-side receiving opening 36, which moves together with the rotor 6, while the rotor 6 is rotating, in order to lock said rotor.

Figure 2:
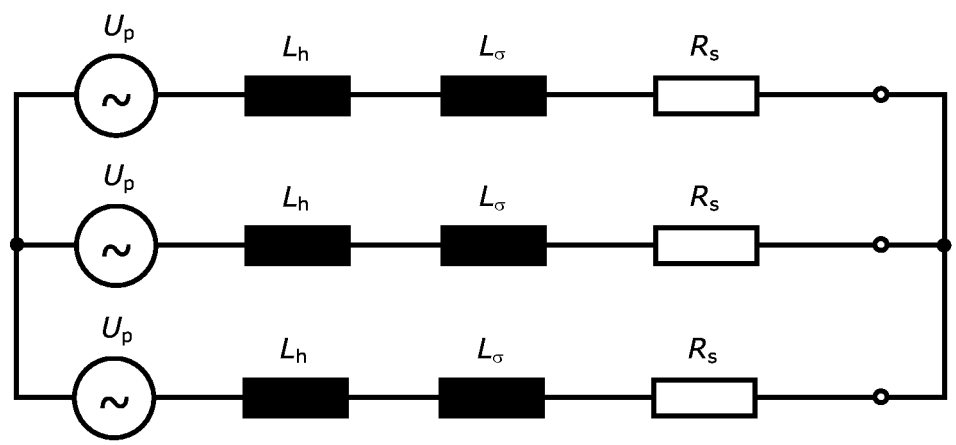
FIG. 2 is an electrical equivalent circuit diagram which shows the short-circuited generator during the creeping rotation movement.

FIG. 2 shows the electrical equivalent circuit diagram of the short-circuited generator 16, wherein $U_p$ is the internal phase e.m.f. (voltage, which is generated by movement induction, in a phase), $L_h$ is the main inductance of a phase, $L_o$ is the stray inductance of a phase, and $R_S$ is the phase resistance of the stator winding 24.

LIST OF REFERENCE SYMBOLS

1 Wind turbine according to the invention
2 Tower
4 Nacelle
6 Rotor
8 Bearing for the rotor
10 Rotor blade
12 Adjusting device
14 Rotor blade axis
16 Generator
18 Generator rotor
20 Permanent magnets
22 Stator of the generator
24 Stator windings
26a, b, c Phases
28 Short-circuiting switch
30 Double-headed arrow
32 Locking bolt
34 Guide bore which is fixed in a frame
36 Rotor-side receiving opening
$U_p$ Internal phase e.m.f.
$L_h$ Main inductance of a phase
$L_o$ Stray inductance of a phase
$R_S$ Phase resistance of the stator winding

The invention claimed is:

1. A method for locking a rotor of a wind turbine, the rotor configured for driving a generator having at least one stator winding which can be short-circuited in order to brake the rotor into a creeping rotation, the rotor having at least one rotor blade which is adjustable by an adjusting device about a longitudinal axis from an operating position to a vane position in which substantially no torque is exerted on the rotor by wind, the rotor being blocked against a rotation in a locking position by inserting a locking bolt into a rotor-side receiving opening, the method comprising the following steps:

moving the wind turbine to an idling mode defined by a state in which the rotor blade is in the vane position by adjusting the at least one rotor blade from the operating position to the vane position;

checking a wind direction after moving the wind turbine to the idling mode and tracking a nacelle of the wind turbine to cause a rotor axis of the rotor to point substantially in the wind direction;

checking a rotor rotation speed to verify the idling mode;

after verifying that the wind turbine is in the idling mode, short-circuiting the at least one stator winding for braking the rotor to initiate the creeping rotation of the rotor, moving the rotor to the locking position with a rotor rotation speed of less than 1 degree/second by adjusting the at least one rotor blade in relation to the vane position depending on the wind speed; and insertingthe locking bolt into the receiving opening after reaching the locking position while the rotor is rotating at the rotor rotation speed of less than 1 degree/second.

2. The method according to claim 1, which further comprises adjusting the at least one rotor blade in an angular range of between approximately 95° and 85° relative to a rotation plane of the rotor in order to move the rotor to the locking position.

3. The method according to claim 1, wherein the creeping rotation is defined by a rotor rotation speed between 0.00 and 0.15 degree/second.

4. The method according to claim 1, which further comprises performing the step of: adjusting the at least one rotor blade from the operating position to the vane position manually depending on at least one of a currently prevailing wind speed or wind direction.

5. The method according to claim 1, wherein the step of tracking the nacelle is performed depending on at least one of a currently prevailing wind speed or wind direction.

6. The method according to claim 1, which further comprises:

automatically performing the step of inserting the locking bolt into the receiving opening after reaching the locking position.

* * * * *